United States Patent [19]

Shirayanagi

[11] Patent Number: 4,950,057
[45] Date of Patent: Aug. 21, 1990

[54] PROGRESSIVE MULTI-FOCAL OPHTHALMIC LENS

[75] Inventor: Moriyasu Shirayanagi, Tokyo, Japan

[73] Assignee: Asahi Kogaku Kogyo Kabushiki Kaisha, Tokyo, Japan

[21] Appl. No.: 456,209

[22] Filed: Dec. 20, 1989

Related U.S. Application Data

[63] Continuation of Ser. No. 369,796, Jun. 22, 1989, abandoned, which is a continuation of Ser. No. 276,164, Nov. 23, 1988, abandoned.

[30] Foreign Application Priority Data

Nov. 30, 1987 [JP] Japan ................. 62-302495

[51] Int. Cl.$^5$ ............. G02C 7/06; G02B 3/08; G02B 3/10
[52] U.S. Cl. ................ 351/169; 350/432; 350/452
[58] Field of Search ............ 351/168–172; 350/452, 432–435

[56] References Cited

U.S. PATENT DOCUMENTS

| | | | |
|---|---|---|---|
| 3,904,281 | 9/1975 | Jampolsky | 350/452 X |
| 4,070,105 | 1/1978 | Marzouk | 351/159 |
| 4,162,122 | 7/1979 | Cohen | 350/452 X |
| 4,210,391 | 7/1980 | Cohen | 350/452 X |
| 4,338,005 | 7/1982 | Cohen | 350/452 X |
| 4,340,283 | 7/1982 | Cohen | 350/452 X |
| 4,729,651 | 3/1988 | Kitani | 351/169 |

FOREIGN PATENT DOCUMENTS

| | | |
|---|---|---|
| 139718 | 8/1982 | Japan . |
| 88718 | 5/1984 | Japan . |
| 260917 | 12/1985 | Japan . |
| 252526 | 11/1986 | Japan . |
| 8606846 | 11/1986 | Japan . |
| 1154360 | 6/1969 | United Kingdom ............. 350/452 |
| 1580484 | 3/1977 | United Kingdom ............. 351/169 |

OTHER PUBLICATIONS

Ziegler, J. F., "Fabrication or Correction of Optical Lenses"; *IBM Technical Disclosure Bulletin;* vol. 12, No. 10; Mar. 1970; pp. 1573–1575.

Journal of the Optical Society of America, vol. 64, No. 4, "Primary Aberrations of Fresnal Lenses", by Erwin Delano, pp. 459–468.

*Primary Examiner*—Scott J. Sugarman
*Attorney, Agent, or Firm*—Sughrue, Mion, Zinn, Macpeak & Seas

[57] ABSTRACT

A progressive multi-focal ophthalmic lens having a front refracting surface and a rear refracting surface one of which is a progressive surface whose refractive power changes continuously with the other being a non-progressive surface. The progressive surface is formed as a Fresnel lens surface composed of microscopic steps so that the macroscopic shape of the progressive surface generally conforms to that of the non-progressive surface.

7 Claims, 5 Drawing Sheets

PROGRESSIVE MULTI-FOCAL OPHTHALMIC LENS

This is a continuation of application Ser. No. 369,796, filed June 22, 1989, now abandoned, which is a continuation of application Ser. No. 276,164, filed Nov. 23, 1988, now abandoned.

BACKGROUND OF THE INVENTION

The present invention relates to an improvement of a progressive multi-focal ophthalmic lens which is characterized by a continuous change in refractive index from the portion of far distance vision to that of near distance vision.

Progressive multi-focal ophthalmic lenses are those lenses which are used in spectacles for the aged and in which there is no boundary between the portion of far distance vision and that of near distance vision. Various proposals have been made with respect to progressive multi-focal ophthalmic lenses as shown in JP-A-57-139718 (the term "JP-A" as used herein means an "unexamined published Japanese patent application"), JP-A-59-88718, JP-A-60-260917 and JP-A-61-252526.

Three examples of the prior art progressive multi-focal ophthalmic lenses are described below together with specific numerical data, and with the problems associated with these examples being pointed out as the need arises.

Figure 1:
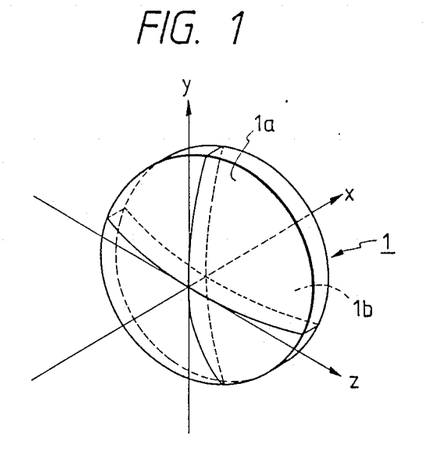
FIG. 1 is a diagram that defines the coordinates for expressing the shape of a lens.

Lens 1 to be described below has a basic geometry as shown in FIG. 1; it has a convex front refracting surface $1a$ and a concave rear refracting surface $1b$, with the front refracting surface $1a$ being a progressive surface whose refractive power changes continuously and the rear refracting surface $1b$ being a spherical surface having a curvature radius of $R_2$.

Also assume here an x-axis which, as shown in FIG. 1, passes through the center of the lens 1, as well as y- and z-axes that are perpendicular to the x-axis and which cross each other at right angles in a plane tangent to the front refracting surface $1a$ of the lens 1.

It is generally known that a smooth three-dimensional curved surface as expressed by $f(x,y,z)=0$ is reasonably approximated within a certain region by the following two-variable high order polynomial:

$$X_o = \sum_{n=1}^{N} An \cdot y^{In} \cdot z^{Jn}.$$

Figure 2:
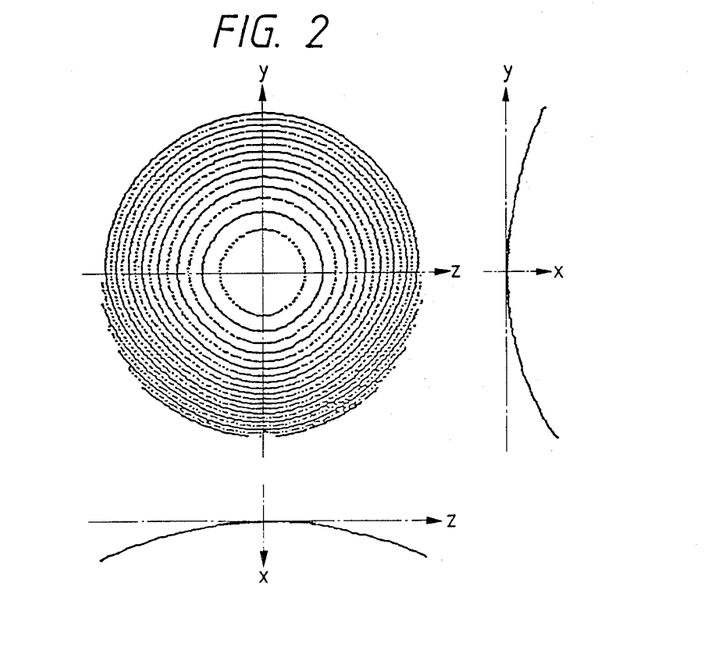
FIG. 2 is a diagram that illustrates the shape of a fundamental aspherical surface.

The front refracting surface $1a$ shown in FIG. 1 is an aspherical surface as expressed by a two-variable 16th order polynominal having the asphericity coefficient. An the specific values of which are shown in Tables 1-1 and 1-2 to be referenced later in this specification. This aspherical surface has a shape as shown in FIG. 2 by way of a contour line diagram (the height distance between solid lines is 1 mm, which applies to the description which follows), a horizontal cross section and a vertical cross section. The notation "E" in Table 1 means "exponent" and "$-8.590E-18$", for example, means "$-8.590 \times 10^{-18}$". The same applies to the other tables given in this specification.

The three examples of the prior art progressive multi-focal ophthalmic lens which are described below are the same in that the front refracting surface $1a$ has the shape defined above and that the outside diameter of the lens is 70 mm, with the constituent material being an acrylic resin (n=1.492). However, these lenses differ in refractive power because of the differences in the shape of the rear refracting surface $1b$.

Prior art example 1

The first example of the prior art progressive multi-focal ophthalmic lens is such that its refractive power is expressed by a spherical power (S) of 0.00 D and an addition power (Add) of 2.75 D.

The shape of the front refracting surface $1a$ of this lens is as described above and need not be explained in detail.

The rear refracting surface $1b$ of this lens is a spherical surface having a curvature radius $R_2$ of 84.150 mm and its x-coordinate is expressed by the following:

$$X_2 = R_2 - \sqrt{R_2^2 - y^2 - z^2} + Tc$$

Figure 3:
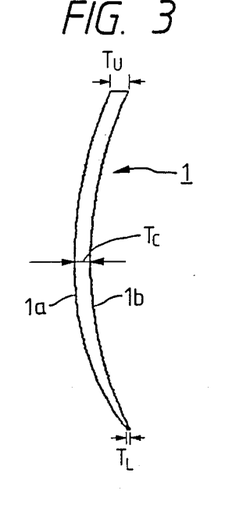
FIGS. 3–5 are vertical cross sections of three prior art progressive multi-focal opthalmic lenses.

This lens has the following thicknesses at its upper end (Tu), Center (Tc) and lower end ($T_L$):
Tu=3.64 mm
Tc=3.55 mm
$T_L$=0.80 mm A vertical cross section of this lens taken along the x-y plane is as shown in FIG. 3. It has a progressively decreasing thickness in its lower half portion since the curvature of the front refracting surface $1a$ increases toward the lower end. In order to ensure a minimum edge thickness of at least about 0.8 mm at its lower end, this lens must have a thickness of about 3.6 mm either at its center or at its upper end, In view of the fact that single vision lenses or plastic bifocal lenses usually have a thickness of about 2.00 mm, one will understand that the above-described example of the prior art progressive multi-focal ophthalmic lens has a considerably large thickness.

Prior art example 2

The second example of the prior art progressive multi-focal ophthalmic lens is such that its refractive power is expressed by a spherical power (S) of +3.00 D and an addition power (Add) of 2.75 D.

The front refracting surface $1a$ of this lens is the same as that for the first example and need not be described in detail.

The rear refracting surface $1b$ of this lens is a spherical surface having a curvature radius $R_2$ of 167.505 mm and its x-coordinate is expressed by the following as in the first example $$X_2 = R_2 - \sqrt{R_2^2 - y^2 - z^2} + Tc$$

Figure 4:
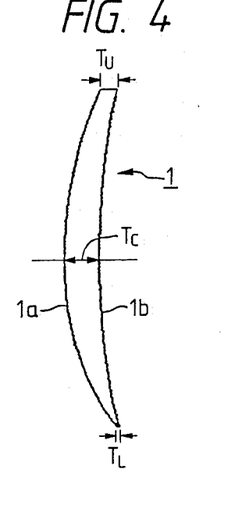

This lens has the following thicknesses at its upper end (Tu), center (Tc) and lower end ($T_L$):
Tu=3.64 mm
Tc=7.47 mm
$T_L$=0.80 mm A vertical cross section of this lens taken alOng the x-y plane is as shown in FIG. 4. Convergent meniscus lenses for use in farsighted glasses generally have a large thickness in the center and this tendency becomes ever greater in a progressive multi-focal ophthalmic lens because of the shape of its front refracting surface $1a$.

Prior art example 3

The third example of the prior art progressive multi-focal ophthalmic lens is the same as the second example in that its refractive power is expressed by a spherical power (S) of +3.00 D and an addition power (Add) of 2.75 D. However, this third example differs from the second one in that in order to avoid an increase in lens thickness, the rear refracting surface is machined to produce relative inclination, so that a prism effect of 2.00 (Δ) will be generated in the central portion of the lens with its prism bottom being directed downwardly. The machining performed to attain this effect is generally referred to as "prism thinning".

The front refracting surface $1a$ of this lens is the same as in the case of the first two examples and need not be described in detail.

The rear refracting surface $1b$ of this lens is a spherical surface having a curvature radius $R_2$ of 169.382 mm and an inclination $\theta_2$ of 2.282 degrees, and its x-coordinate is expressed by the following:

$$X_2 = R_2\cos\theta_2 - \sqrt{R_2^2 - (y - R_2\sin\theta_2)^2 - z^2} + Tc$$

This lens has the following thicknesses at its upper end (Tu), center (Tc) and lower end ($T_L$):

Tu = 0.80 mm
Tc = 6.09 mm
$T_L$ = 0.80 mm

Figure 5:
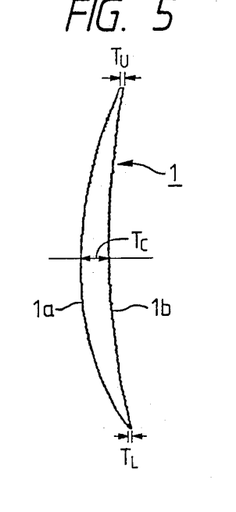

A vertical cross section of this lens taken along the x-y plane is as shown in FIG. 5. The lens thickness at the periphery can be made smaller than in the first and second examples. However, the prism effect of this lens which should inherently be absent from an ophthalmic prescription will deflect the optical axis, potentially causing undesired effects. Furthermore, the thickness at the center of this lens is slightly smaller than that of the second example but not by a satisfactory degree.

TABLE 1-1

| In | Jn 0 | 1 | 2 | 3 | 4 | 5 | 6 | 7 | 8 |
|----|------|---|---|---|---|---|---|---|---|
| 0 | 0.000 | −1.040E-5 | 5.846E-3 | 2.511E-7 | 6.461E-7 | −2.158E-9 | −9.186E-10 | 8.356E-12 | −5.225E-13 |
| 1 | 7.587E-4 | −1.288E-6 | −7.411E-5 | 3.063E-8 | 1.301E-7 | −2.280E-10 | −1.761E-10 | 6.932E-13 | −6.858E-14 |
| 2 | 5.930E-3 | 2.819E-7 | 1.801E-5 | −1.488E-9 | −4.175E-8 | 3.579E-12 | 7.051E-11 | −7.264E-15 | −8.241E-14 |
| 3 | −3.683E-5 | 2.963E-8 | −5.919E-7 | −2.069E-10 | 6.359E-10 | 8.886E-13 | 1.223E-12 | −2.141E-15 | −2.555E-15 |
| 4 | 1.877E-6 | −2.127E-9 | −7.597E-8 | 9.233E-12 | 2.174E-10 | −1.036E-14 | −3.769E-13 | 1.475E-18 | 3.605E-16 |
| 5 | 2.866E-8 | −2.120E-10 | 3.220E-9 | 8.886E-13 | −6.090E-12 | −1.823E-15 | 2.700E-15 | 2.439E-18 | 8.437E-19 |
| 6 | 4.526E-9 | 5.862E-12 | 1.728E-10 | −2.566E-14 | −3.986E-13 | 2.514E-17 | 5.661E-16 | −7.177E-21 | −3.945E-19 |
| 7 | −1.664E-10 | 5.901E-13 | −6.577E-12 | −2.141E-15 | 1.160E-14 | 2.439E-18 | −5.795E-18 | −1.720E-21 | 7.030E-22 |
| 8 | −2.765E-11 | −6.034E-15 | −2.305E-13 | 3.261E-17 | 3.448E-16 | −2.296E-20 | −3.289E-19 | 4.529E-24 | 1.256E-22 |
| 9 | 4.008E-13 | −6.177E-16 | 6.527E-15 | 2.690E-18 | −8.590E-18 | −1.683E-21 | 2.478E-21 | 5.065E-25 | |
| 10 | 5.835E-14 | −1.897E-19 | 1.843E-16 | −1.931E-20 | −1.469E-19 | 6.936E-24 | 6.369E-23 | | |
| 11 | −4.566E-16 | −4.136E-20 | −3.161E-18 | −1.671E-21 | 2.249E-21 | 4.462E-25 | | | |
| 12 | −6.137E-17 | 3.987E-21 | −8.134E-20 | 4.351E-24 | 2.576E-23 | | | | |
| 13 | 2.485E-19 | 4.584E-22 | 5.979E-22 | 4.065E-25 | | | | | |
| 14 | 3.206E-20 | −1.758E-24 | 1.505E-23 | | | | | | |
| 15 | −5.216E-23 | −2.043E-25 | | | | | | | |
| 16 | −6.600E-24 | | | | | | | | |

TABLE 1-2

| In | Jn 9 | 10 | 11 | 12 | 13 | 14 | 15 | 16 |
|----|------|----|----|----|----|----|----|----|
| 0 | −1.640E-14 | 6.889E-15 | 1.688E-17 | −1.257E-17 | −8.642E-21 | 9.332E-21 | 1.728E-24 | −2.509E-24 |
| 1 | −9.370E-16 | 4.021E-16 | 4.559E-19 | −3.534E-19 | 8.527E-23 | 9.896E-23 | −9.765E-26 | |
| 2 | 1.109E-17 | 6.488E-17 | −8.964E-21 | −3.160E-20 | 2.737E-24 | 6.946E-24 | | |
| 3 | 2.690E-18 | 1.606E-18 | −1.671E-21 | −3.367E-22 | 4.065E-25 | | | |
| 4 | 3.496E-21 | −1.724E-19 | −1.398E-24 | 3.342E-23 | | | | |
| 5 | −1.683E-21 | −6.419E-22 | 4.462E-25 | | | | | |
| 6 | −5.983E-25 | 9.762E-23 | | | | | | |
| 7 | 5.065E-25 | | | | | | | |

BRIEF DESCRIPTION OF THE DRAWINGS

FIG. 6–8 show a progressive multi-focal ophthalmic lens according to a first embodiment of the present invention.

FIGS. 9–11 show a progressive multi-focal ophthalmic lens according to a second embodiment of the present invention.

FIG. 12–14 show a progressive multi-focal ophthalmic lens according to a third embodiment of the present invention.

SUMMARY OF THE INVENTION

The present invention has been accomplished under the afore-mentioned circumstances of the prior art and its principal object is to provide a progressive multi-focal ophthalmic lens that is made smaller in thickness both at the periphery and in its central portion without imparting a prism effect.

The above-stated object of the present invention can be attained by a progressive multi-focal ophthalmic lens having a front refracting surface and a rear refracting surface one of which is a progressive surface whose refractive power changes continuously with the other being a non-progressive surface, characterized in that the progressive surface is formed as a Fresnel lens surface composed of microscopic steps so that the macroscopic shape of the progressive surface generally conforms to that of the non-progressive surface.

DETAILED DESCRIPTION OF THE PREFERRED EMBODIMENTS

Three embodiments of the present invention are described hereinafter with reference to FIGS. 6–14.

The lenses to be described below have a basic geometry which is the same as shown in FIG. 1 with respect to the prior art product; it has a front refracting surface $1a$ which is a progressive surface whose refractive power changes continuously, and a rear refracting surface $1b$ which is a non-progressive spherical surface.

The progressive surfaces of the lenses according to the three embodiments described below have different macroscopic shapes because they are formed as Fresnel lens surfaces composed of microscopic steps in different states. However, these progressive surfaces attain optically the same effect. The optical effect of these progressive surfaces is designed to be equivalent to that of an aspherical surface (hereinafter referred to as a fundamental aspherical surface) that has the asphericity coefficient An the specific values of which are prescribed in Tables 1-1 and, 1-2 and which is expressed by the two-variable 16th order polynominal of:

$$X_o = \sum_{n=1}^{N} An \cdot y^{Jn} \cdot z^{Jn}$$

The shape of this fundamental aspherical surface is shown in FIG. 2 by way of a contour line diagram, a horizontal cross section and a vertical cross section. The upper half ($y>0$) of this surface is generally spherical and the curvature of its lower half ($y<0$) increases progressively toward the lower end, forming a smooth and continuous overall aspherical surface.

If the front refracting surface $1a$ of the lens is machined to form a Fresnel lens surface, it will have a macroscopic shape $X_1$ as defined by:

$$X_1 = X_o + \sum_{m=1}^{M} Fm \cdot y^{Kn} \cdot z^{Lm}$$

This formula shows that the macroscopic shape $X_1$ of the front refracting surface $1a$ formed as s Fresnel lens surface is the same as the shape of the fundamental aspherical surface $X_0$ plus the Fresnel addition expressed by a two-variable high-order polynominal. In the formula set forth above, $F_m$ is the coefficient of a function that determines the Fresnel addition and this is herein defined as a Fresnel coefficient.

The lenses in the three embodiments to be described below are assumed to have a diameter of 70 mm and be made of an acrylic resin ($n=1.492$).

First embodiment

The first embodiment of the present invention is a progressive multi-focal ophthalmic lens whose refractive power is expressed by a spherical power (S) of 0.00 D and an addition power (Add) of 2.75 D. The shape of this lens and the method of machining a Fresnel lens surface on it are described below.

The front refracting surface $1a$ of this lens is designed such that it is a spherical surface having a curvature radius $R_1$ of 85.319 mm, with its macroscopic shape being as shown by a contour line diagram in FIG. 1. Stated more specifically, the Fresnel coefficient $F_m$ is set in such a way as to satisfy the following condition:

$$X_1 = X_o + \sum_{m=1}^{M} Fm \cdot y^{Km} \cdot z^{Lm} \approx R_1 - \sqrt{R_1^2 - y^2 - z^2}$$

The specific values of the Fresnel coefficient Fm are shown in Tables 2-1 and 2-2 to be given later in this specification.

Figure 7:
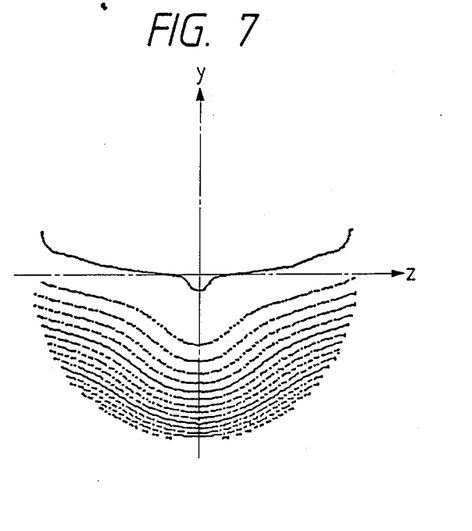
FIG. 7 is a diagram illustrating the amount of Fresnel addition.

The amount of Fresnel addition ($x_1-x_0$) is as shown by a contour line diagram in FIG. 7. In the embodiment under discussion, the shape of the upper half of the fundamental aspherical surface is left intact and Fresnel addition is provided for its lower half portion.

Figure 6:
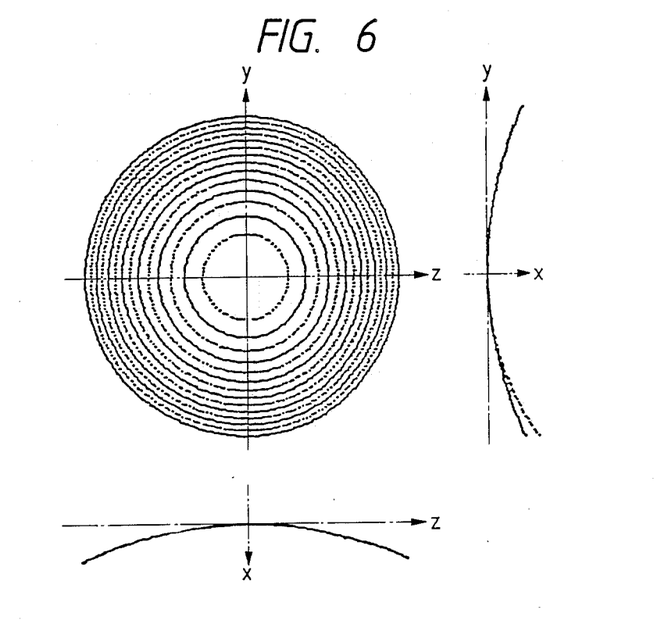
FIG. 6 is a diagram illustrating the shape of a front refracting surface.

The shape of the front refracting surface $1a$ provided with Fresnel addition is as shown in FIG. 6 by way of a contour line diagram, a vertical cross section and a horizontal cross section. In the vertical cross section, the shape of the surface $1a$ with Fresnel addition is indicated by a solid line and that of the fundamental aspherical surface is shown by a dashed line so that one will readily see the difference between the two surfaces.

The rear refracting surface $1b$ of the lens according to the first embodiment of the present invention is a spherical surface having a curvature radius $R_2$ of 84.660 mm and its x-coordinate is expressed by:

$$X_2 = R_2 - \sqrt{R_2^2 - y^2 - z^2} + Tc$$

Figure 8:
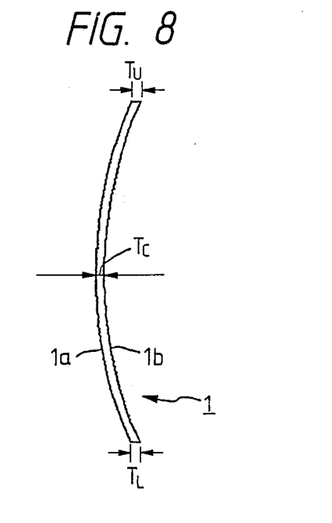
FIG. 8 is a vertical cross section of lens.

This lens has the following thicknesses at its upper end (Tu), center (Tc) and lower end ($T_L$):
Tu=2.06 mm
Tc=2.00 mm
$T_L$=2.06 mm A vertical cross section of this lens is as shown in FIG. 8. Since the front refracting surface $1a$ is made generally parallel to the rear refracting surface $1b$, the lens maintains a generally uniform thickness of about 2 mm over its entire surface, which is approximately the same as the thickness of a single vision lens having a spherical power S of 0.00 D.

Second embodiment

The second embodiment of the present invention is a progressive multi-focal ophthalmic lens whose refractive power is the same as that of the lens according to the first embodiment (S=0.00 D and Add =2.75 D). However, this lens is provided with a Fresnel lens surface in a different form than the lens of the first embodiment.

The front refracting surface $1a$ of this lens is designed such that the macroscopic shape of the line at z=0 is an arc having a curvature radius $R_1$ of 85.319 mm, with Fresnel addition being provided solely by a function in the y-direction. In other words, the second embodiment is a special case of the first embodiment in that Lm=0 in the formula of Fresnel addition set forth above.

Figure 9:
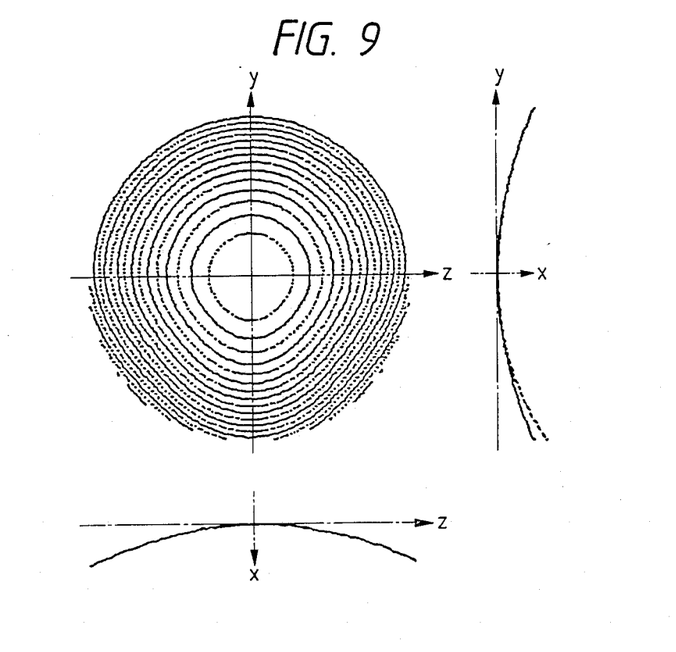
FIG. 9 is a diagram illustrating the shape of a front refracting surface.
Figure 10:
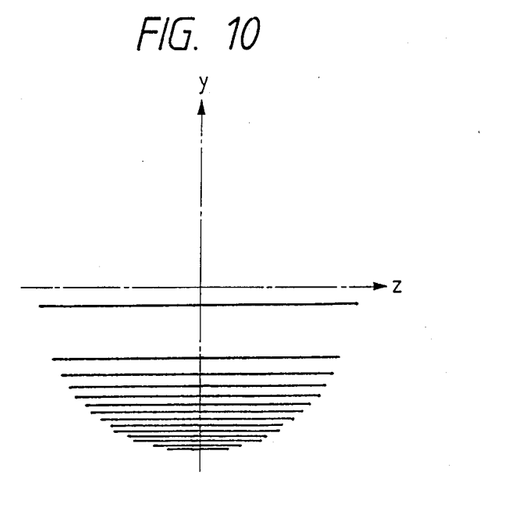
FIG. 10 is a diagram illustrating the amount of Fresnel addition.

The overall macroscopic shape of the front refracting surface $1a$ is as shown in FIG. 9 by way of a contour line diagram, a vertical cross section and a horizontal cross section.

The specific values of the Fresnel coefficient Fm for the surface 1a are shown in Table 3 to be given later in this specification. The amount of Fresnel addition ($x_1 - x_0$) is as shown by a contour line diagram in FIG. 10. As in the first embodiment, it is the lower half portion of the fundamental aspherical surface that is to be provided with Fresnel addition.

The shape of the surface 1a as it is provided with Fresnel addition and that of the fundamental aspherical surface are shown by a solid and a dashed line, respectively, in FIG. 9 by way of a vertical cross section.

The rear refracting surface 1b of the lens according to the second embodiment of the present invention is a spherical surface having a curvature radius $R_2$ of 84.549 mm and its x-coordinate is expressed by:

$$X_2 = R_2 - \sqrt{R_2^2 - y^2 - z^2} + Tc$$

Figure 11:
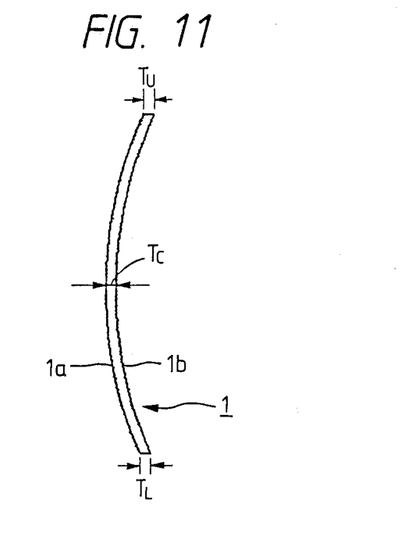
FIG. 11 is a vertical cross section of the lens.

This lens has the following thicknesses at its upper end (Tu), center (Tc) and lower end ($T_L$):
Tu=2.41 mm
Tc=2.33 mm
$T_L$=2.41 mm A vertical cross section of this lens is as shown in FIG. 11. In the second embodiment, the macroscopic shape of the front refracting surface 1a is not a completely spherical surface but both sides of the lower half of the lens have a strongly curved portion left. As a result, the lens is somewhat thicker than the lens of the first embodiment but its thickness is appreciably reduced compared to the prior art product.

Since the amount of Fresnel addition is a function of only y, the second embodiment has the additional advantage of reducing the load on the control of machining operations.

Third embodiment

The third embodiment of the present invention is a progressive multi-focal ophthalmic lens whose refractive power is expressed by a spherical power (S) of +3.00 D and an additional power (Add) of 2.75 D. This lens is macroscopically more flattered than the lenses of the previous embodiments. Details of the shape of the lens and the method of machining a Fresnel lens surface on it are described below.

Figure 12:
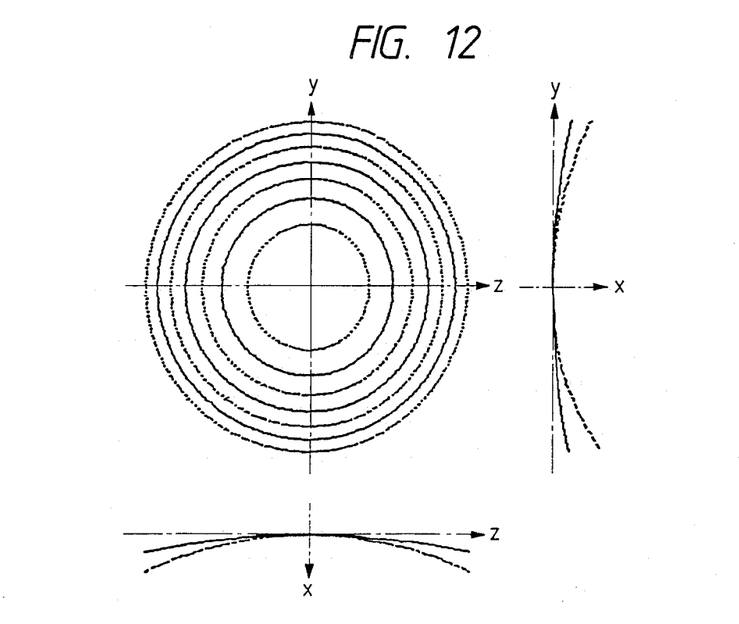
FIG. 12 is a diagram illustrating the shape of a front refracting surface.

The front refracting surface 1a of this lens is designed such that it is a spherical surface having a curvature radius $R_1$ of 175.048 mm, with its macroscopic shape being as shown by a contour line diagram in FIG. 12. Stated more specifically, the Fresnel coefficient Fm is set in such a way as to satisfy the following condition:

$$X_1 \approx R_1 - \sqrt{R_1^2 - y^2 - z^2} .$$

The specific values of the Fresnel coefficient are shown in Tables 4-1 and 4-2 to be given later in this specification.

Figure 13:
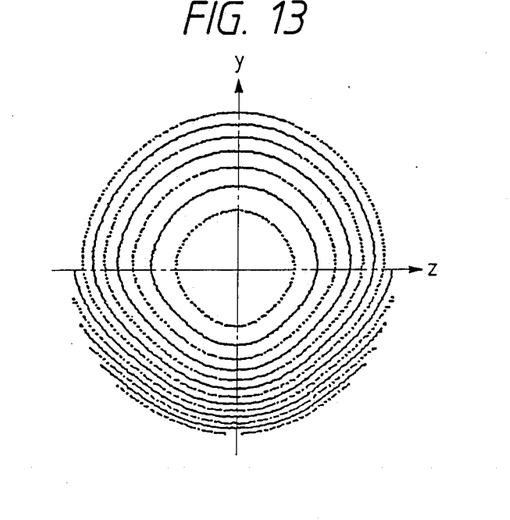
FIG. 13 is a diagram illustrating the amount of Fresnel addition.

The amount of Fresnel addition ($X_1 - H_0$) is as known by a contour line diagram in FIG. 13. As will be readily understood from FIG. 2, the shape of the fundamental aspherical surface is such that its upper half is generally spherical while the lower half is aspherical. The macroscopic shape of the lens that is to be obtained in the third embodiment as a result of Fresnel addition is such that its radius of curvature is greater than that of the fundamental aspherical surface, so Fresnel addition is to be provided for the whole area of the front refracting surface 1a.

The shape of the front refracting surface 1a after Fresnel addition is as shown in FIG. 12 by way of a contour line diagram, a vertical cross section and a horizontal cross section. In the vertical and horizontal cross sections, the shape of the surface 1a with Fresnel addition is indicated by a solid line and that of the fundamental aspherical surface is shown by a dashed line, so that one will readily see the difference between the surfaces.

The rear refracting surface 1b of the lens according to third embodiment of the present invention is a spherical surface having a curvature radius $R_2$ of 175.048 mm and its x-coordinate is expressed by:

$$X_2 = R_2 - \sqrt{R_2^2 - y^2 - z^2} + Tc$$

Figure 14:
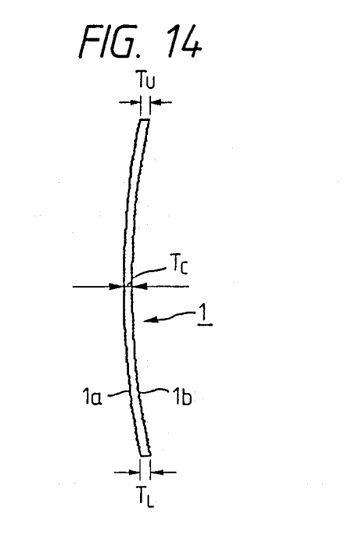
FIG. 14 is a vertical cross section of the lens.

The lens has the following thickness at its upper end (Tu), center (Tc) and lower end ($T_L$):
Tu=2.00 mm
Tc=2.00 mm
$T_L$=2.00 mm A vertical cross section of this lens is as shown in FIG. 14. Since the front refracting surface 1a is made substantially parallel to the rear refracting surface 1b, the lens maintains a uniform thickness of about 2 mm over its entire surface, which is approximately the same as the thickness of a single vision lens having a spherical power (S) of 0.00 D.

The three embodiments described above are all directed to a basic composition in which the front refracting surface is made progressive and the non-progressive surface spherical. It should, however, be noted that the rear refracting surface rather than the front refracting surface may be made progressive. It is also possible to render the non-progressive surface toric rather than spherical. In the embodiments, the fundamental aspheric surface and the amount of Fresnel addition are expressed by polynominals but it will be obvious to those skilled in the art that the concept of the present invention will also apply even if they are formulated by other expressions.

TABLE 2-1

| $K_m$ | $L_m$ 0 | 1 | 2 | 3 | 4 | 5 | 6 | 7 | 8 |
|---|---|---|---|---|---|---|---|---|---|
| 0 | 0.000 | 1.040E-5 | 1.491E-5 | −2.511E-7 | −4.451E-7 | 2.158E-9 | 9.325E-10 | −8.356E-12 | 5.238E-13 |
| 1 | −7.587E-4 | 1.288E-6 | 7.411E-5 | −3.063E-8 | −1.301E-7 | 2.280E-10 | 1.761E-10 | −6.932E-13 | 6.858E-14 |
| 2 | −6.969E-5 | −2.819E-7 | −1.760E-5 | 1.488E-9 | 4.179E-8 | −3.579E-12 | −7.051E-11 | 7.264E-15 | 8.241E-14 |
| 3 | 3.683E-5 | −2.963E-8 | 5.919E-7 | 2.069E-10 | −6.359E-10 | −8.886E-13 | −1.223E-12 | 2.141E-15 | 2.555E-15 |
| 4 | −1.676E-6 | 2.127E-9 | 7.601E-8 | −9.233E-12 | −2.174E-10 | 1.036E-14 | 3.769E-13 | −1.475E-18 | −3.605E-16 |
| 5 | −2.866E-8 | 2.120E-10 | −3.220E-9 | −8.886E-13 | 6.090E-12 | 1.823E-15 | −2.700E-15 | −2.439E-18 | −8.437E-19 |

TABLE 2-1-continued

| $K_m$ | \multicolumn{9}{c}{$L_m$} |
|---|---|---|---|---|---|---|---|---|---|
| | 0 | 1 | 2 | 3 | 4 | 5 | 6 | 7 | 8 |
| 6 | −4.512E-9 | −5.862E-12 | −1.728E-10 | 2.566E-14 | 3.986E-13 | −2.514E-17 | −5.661E-16 | 7.177E-21 | 3.945E-19 |
| 7 | 1.664E-10 | −5.901E-13 | 6.577E-12 | 2.141E-15 | −1.160E-14 | −2.439E-18 | 5.795E-18 | 1.720E-21 | −7.030E-22 |
| 8 | 2.765E-11 | 6.034E-15 | 2.305E-13 | −3.261E-17 | −3.448E-16 | 2.296E-20 | 3.289E-19 | −4.529E-24 | −1.256E-22 |
| 9 | −4.008E-13 | 6.177E-16 | −6.527E-15 | −2.690E-18 | 8.590E-18 | 1.683E-21 | −2.478E-21 | −5.065E-25 | |
| 10 | −5.835E-14 | 1.897E-19 | −1.843E-16 | 1.931E-20 | 1.469E-19 | −6.936E-24 | −6.369E-23 | | |
| 11 | 4.566E-16 | 4.136E-20 | 3.161E-18 | 1.671E-21 | −2.249E-21 | −4.462E-25 | | | |
| 12 | 6.137E-17 | −3.987E-21 | 8.134E-20 | −4.351E-24 | −2.576E-23 | | | | |
| 13 | −2.485E-19 | −4.584E-22 | −5.979E-22 | −4.065E-25 | | | | | |
| 14 | −3.206E-20 | 1.758E-24 | −1.505E-23 | | | | | | |
| 15 | 5.216E-23 | 2.043E-25 | | | | | | | |
| 16 | 6.600E-24 | | | | | | | | |

TABLE 2-2

| $K_m$ | \multicolumn{8}{c}{$L_m$} |
|---|---|---|---|---|---|---|---|---|
| | 9 | 10 | 11 | 12 | 13 | 14 | 15 | 16 |
| 0 | 1.640E-14 | −6.889E-15 | −1.688E-17 | 1.257E-17 | 8.642E-21 | −9.332E-21 | −1.728E-24 | 2.509E-24 |
| 1 | 9.370E-16 | −4.021E-16 | −4.559E-19 | 3.534E-19 | −8.527E-23 | −9.896E-23 | 9.765E-26 | |
| 2 | −1.109E-17 | −6.488E-17 | 8.964E-21 | 3.160E-20 | −2.737E-24 | −6.946E-24 | | |
| 3 | −2.690E-18 | −1.606E-18 | 1.671E-21 | 3.367E-22 | −4.065E-25 | | | |
| 4 | −3.496E-21 | 1.724E-19 | 1.398E-24 | −3.342E-23 | | | | |
| 5 | 1.683E-21 | 6.419E-22 | −4.462E-25 | | | | | |
| 6 | 5.983E-25 | −9.762E-23 | | | | | | |
| 7 | −5.065E-25 | | | | | | | |

TABLE 3

| $K_m$ | $F_m$ |
|---|---|
| 0 | 0.000 |
| 1 | −7.587E-4 |
| 2 | −6.969E-5 |
| 3 | 3.683E-5 |
| 4 | −1.676E-6 |
| 5 | −2.866E-8 |
| 6 | −4.512E-9 |
| 7 | 1.664E-10 |
| 8 | 2.765E-11 |

TABLE 3-continued

| $K_m$ | $F_m$ |
|---|---|
| 9 | −4.008E-13 |
| 10 | −5.835E-14 |
| 11 | 4.566E-16 |
| 12 | 6.137E-17 |
| 13 | −2.485E-19 |
| 14 | −3.206E-20 |
| 15 | 5.216E-23 |
| 16 | 6.600E-24 |

TABLE 4-1

| $K_m$ | \multicolumn{9}{c}{$L_m$} |
|---|---|---|---|---|---|---|---|---|---|
| | 0 | 1 | 2 | 3 | 4 | 5 | 6 | 7 | 8 |
| 0 | 0.000 | 1.040E-5 | −2.989E-3 | −2.511E-7 | −6.221E-7 | 2.158E-9 | 9.177E-10 | −8.356E-12 | 5.238E-13 |
| 1 | −7.587E-4 | 1.288E-6 | 7.411E-5 | −3.063E-8 | −1.301E-7 | 2.280E-10 | 1.761E-10 | −6.932E-13 | 6.858E-14 |
| 2 | −3.074E-3 | −2.819E-7 | −1.796E-5 | 1.488E-9 | 4.174E-8 | −3.579E-12 | −7.051E-11 | 7.264E-15 | 8.240E-14 |
| 3 | 3.683E-5 | −2.963E-8 | 5.919E-7 | 2.069E-10 | −6.359E-10 | −8.886E-13 | −1.223E-12 | 2.141E-15 | 2.555E-15 |
| 4 | −1.853E-6 | 2.127E-9 | 7.596E-8 | −9.233E-12 | −2.174E-10 | 1.036E-14 | 3.769E-13 | −1.475E-18 | −3.605E-16 |
| 5 | −2.866E-8 | 2.120E-10 | −3.220E-9 | −8.886E-13 | 6.090E-12 | 1.823E-15 | −2.700E-15 | −2.439E-18 | −8.437E-19 |
| 6 | −4.527E-9 | −5.862E-12 | −1.728E-10 | 2.566E-14 | 3.986E-13 | −2.514E-17 | −5.661E-16 | 7.177E-21 | 3.945E-19 |
| 7 | 1.664E-10 | −5.901E-13 | 6.577E-12 | 2.141E-15 | −1.160E-14 | −2.439E-18 | 5.795E-18 | 1.720E-21 | −7.030E-22 |
| 8 | 2.765E-11 | 6.034E-15 | 2.305E-13 | −3.261E-17 | −3.448E-16 | 2.296E-20 | 3.289E-19 | −4.529E-24 | −1.256E-22 |
| 9 | −4.008E-13 | 6.177E-16 | −6.527E-15 | −2.690E-18 | 8.590E-18 | 1.683E-21 | −2.478E-21 | −5.065E-25 | |
| 10 | −5.835E-14 | 1.897E-19 | −1.843E-16 | 1.931E-20 | 1.469E-19 | −6.936E-24 | −6.369E-23 | | |
| 11 | 4.566E-16 | 4.136E-20 | 3.161E-18 | 1.671E-21 | −2.249E-21 | −4.462E-25 | | | |
| 12 | 6.137E-17 | −3.987E-21 | 8.134E-20 | −4.351E-24 | −2.576E-23 | | | | |
| 13 | −2.485E-19 | −4.584E-22 | −5.979E-22 | −4.065E-25 | | | | | |
| 14 | −3.206E-20 | 1.758E-24 | −1.505E-23 | | | | | | |
| 15 | 5.216E-23 | 2.043E-25 | | | | | | | |
| 16 | 6.600E-24 | | | | | | | | |

| 9 | −4.008E-13 |

TABLE 4-2

| $K_m$ | \multicolumn{8}{c}{$L_m$} |
|---|---|---|---|---|---|---|---|---|
| | 9 | 10 | 11 | 12 | 13 | 14 | 15 | 16 |
| 0 | 1.640E-14 | −6.889E-15 | −1.688E-17 | 1.257E-17 | 8.642E-21 | −9.332E-21 | −1.728E-24 | 2.509E-24 |
| 1 | 9.370E-16 | −4.021E-16 | −4.559E-19 | 3.534E-19 | −8.527E-23 | −9.896E-23 | 9.765E-26 | |
| 2 | −1.109E-17 | −6.488E-17 | 8.964E-21 | 3.160E-20 | −2.737E-24 | −6.946E-24 | | |
| 3 | −2.690E-18 | −1.606E-18 | 1.671E-21 | 3.367E-22 | −4.065E-25 | | | |
| 4 | −3.496E-21 | 1.724E-19 | 1.398E-24 | −3.342E-23 | | | | |
| 5 | 1.683E-21 | 6.419E-22 | −4.462E-25 | | | | | |
| 6 | 5.983E-25 | −9.762E-23 | | | | | | |
| 7 | −5.065E-25 | | | | | | | |

As described on the foregoing pages, the progressive multi-focal ophthalmic lens of the present invention has its progressive surface formed as a Fresnel lens surface which generally conforms to the surface of the non-progressive surface. Therefore, this lens maintains a generally uniform thickness over its entire surface and its thickness can satisfactorily be reduced without employing any special technique such as prism thinning.

I claim:

1. In a progressive multi-focal ophthalmic lens having a front refracting surface and a rear refracting surface one of which is a progressive surface whose refractive power changes continuously with the other being a non-progressive surface, the improvement wherein said progressive surface is formed as a Fresnel lens surface composed of microscopic steps so that the macroscopic shape of said progressive surface generally conforms to that of said non-progressive surface.

2. A progressive multi-focal ophthalmic lens according to claim 1 wherein said front refracting surface is progressive and said rear refracting surface is non-progressive.

3. A progressive multi-focal ophthalmic lens according to claim 1 wherein said front refracting surface is non-progressive and said rear refracting surface is progressive.

4. A progressive multi-focal ophthalmic lens according to claim 1 wherein said Fresnel lens surface has a macroscopic shape expressed by:

$$X_1 = X_o + \sum_{m=1}^{M} Fm \cdot y^{Kn} \cdot z^{Lm}$$

assuming an orthogonal coordinate system, with the central axis of the lens as the x-axis, and the y- and z-axes being perpendicular to the x-axis and crossing each other at right angles in a plane tangent to said Fresnel lens surface, where Fm is a Fresnel coefficient, and $X_0$ is expressed by:

$$X_o = \sum_{n=1}^{N} An \cdot y^{In} \cdot z^{Jn}$$

where An is an asphericity coefficient.

5. A progressive multi-focal ophthalmic lens according to claim 4 wherein $X_1$ is approximately equal to:

$$R_1 - \sqrt{R_1^2 - y^2 - z^2}$$

where $R_1$ is the radius of curvature of the Fresnel lens surface, and the non-progressive surface has an x-coordinate expressed by:

$$X_2 = R_2 - \sqrt{R_2^2 - y^2 - z^2} + Tc$$

where Tc is the thickness of the lens at its center.

6. A progressive multi-focal ophthalmic lens according to claim 5 wherein Lm=0.

7. A progressive multi-focal ophthalmic lens according to claim 4 whose refractive power is expressed by a spherical power S of +3.00 D and an addition power Add of 2.75 D and wherein $X_1$ is approximately equal to:

$$R_1 - \sqrt{R_1^2 - y^2 - z^2}$$

where $R_1$ is the radius of curvature of the Fresnel lens surface, and the non-progressive surface has an x-coordinate expressed by:

$$X_2 = R_2 - \sqrt{R_2^2 - y^2 - z^2} + Tc$$

where Tc is the thickness of the lens at its center.

* * * * *